Dec. 5, 1944.  H. E. UPHAM  2,364,572
METHOD OF MAKING AN ELECTRO-MAGNETIC IMPULSE MOTOR
Original Filed Oct. 17, 1942
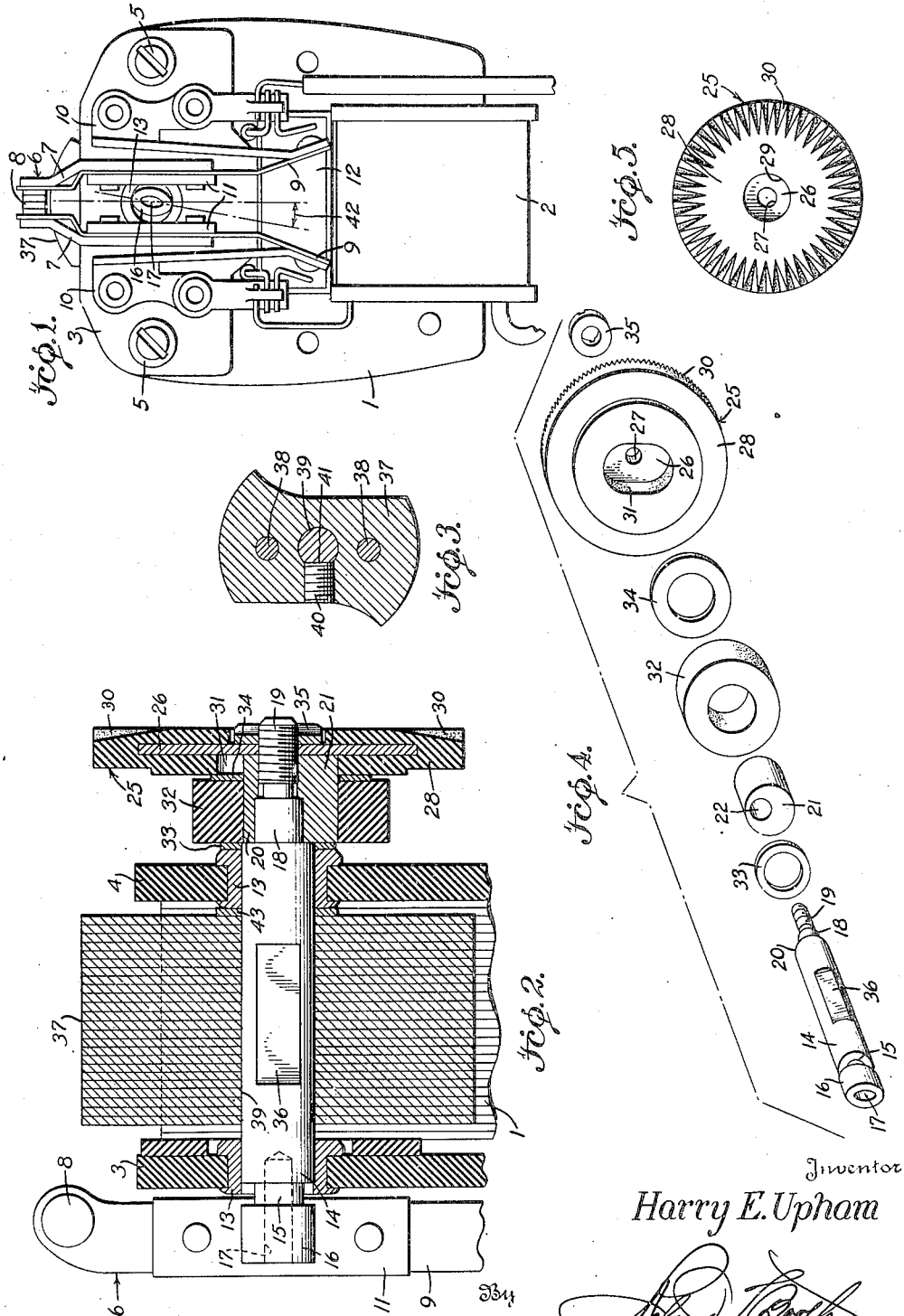
Inventor
Harry E. Upham
Attorney Patented Dec. 5, 1944

2,364,572

UNITED STATES PATENT OFFICE 2,364,572

METHOD OF MAKING ELECTROMAGNETIC IMPULSE MOTORS

Harry E. Upham, Bridgeport, Conn., assignor to Remington Rand Inc., Buffalo, N. Y., a corporation of Delaware Original application October 17, 1942, Serial No. 462,383. Divided and this application May 22, 1943, Serial No. 488,051

3 Claims. (Cl. 29—155.53)

This invention relates to method of making an electro-magnetic impulse motor of the make and break contact type, such as used in electric dry shavers, and particularly to improvements in the rotor mounting and rotor shaft structure.

This application is a division of application Serial No. 462,383 filed October 17, 1942.

The invention is directed to improving the rotor mounting structure in a way that will facilitate the manufacture of the parts and eliminate the use of specially skilled labor in the assembly and adjustment of the parts so as to reduce the cost of manufacture to a considerable extent.

The invention comprehends the provision of a rotor assembly structure wherein the contact operating cam can be formed on the end of the rotor shaft in a convenient manner with the elimination of expensive machining operations and with the production of the shafts in a uniform manner so they are interchangeable with one another and the other parts of the motor with which they are associated.

The invention provides for the assembly of the rotor on the rotor shaft in a fixed radial position relative to the shaft in order that the required angular relation between the poles of the rotor and the major axis of the contact operating cam can be obtained in the assembly of the motor in a simple manner without the use of special gauges in order that the rotor and contact operating cam will be arranged so that the contacts of the motor are made and broken at the desired points in the rotation of the rotor to secure the most efficient operation of the motor.

The invention contains a number of other features involved in the structure and assembly of the rotor and the rotor shaft with its various parts that will be apparent from the following specific description of the structure and the claims.

In the drawing:

Fig. 1 shows a side elevation of the contact carrying side of an electro-magnetic impulse motor in which the scale of the motor as illustrated is substantially enlarged.

Fig. 2 is a fragmentary transverse cross section through the upper portion of the motor as shown in Fig. 1 substantially enlarged from the showing in Fig. 1, illustrating the rotor assembly structure in cross section, the section extending axially along the rotor shaft.

Fig. 3 is a section taken transversely to the rotor shaft, on a scale of the size indicated in Fig. 1, showing how the rotor is held in a predetermined radial position on the rotor shaft.

Fig. 4 shows the rotor shaft and the parts assembled thereon with the exception of the rotor in perspective and disassembled relation.

Fig. 5 is a side elevation of the opposite side of the starting wheel from that shown in Fig. 4.

The motor has a stator frame 1 carrying a field winding 2. Frame 1 is of substantial U-shape as illustrated in Fig. 1 having the free ends of the legs forming the U-shape frame providing the stator poles. Frame 1 is preferably constructed of laminated magnetizable metal of a character well-known in the art. The structure of stator frame 1 as illustrated in Fig. 1, is well-known in the art and is incorporated in shaver motors now in commercial use. The free ends or poles of stator frame 1 have a pair of insulating plate members 3 and 4 respectively, secured to the opposite side faces thereof in spaced parallel relation by means of suitable bolts 5.

A contact structure indicated generally at 6 in Fig. 1 is mounted on insulating plate 3. Contact structure 6 is of conventional form and has a pair of contact arms 7 each carrying a contact point 8 at one end and each having a spring arm extension 9 extending from the other end and connected to a supporting bracket 10 suitably secured by rivets or the like to insulating plate 3. This contact structure is of a conventional type now well-known in the art and is connected in circuit in series with field winding 2. Bearing pads of suitable insulating material are indicated at 11 and are adapted to be engaged by the contact operating cam to break engagement of points 8 in the conventional manner. The usual condenser shunted across the contact points is indicated at 12.

Insulating plates 3 and 4 are provided with rotor bearings 13 arranged in axially aligned relation and suitably riveted permanently in position in plates 3 and 4.

The invention is particularly directed to the construction and assembly of the rotor shaft, the rotor, the contact operating cam, the eccentric and the starting wheel, and adjustment of these parts in their assembled relation in bearings 13. This structure will now be described.

A rotor shaft 14 has opposite end portions rotatably mounted in bearings 13. The left-hand end of shaft 14, as illustrated in Fig. 2, has a reduced extension 15 and a contact operating cam 16 formed at the outer end thereof. The end of the shaft 14 including extension 15 and cam 16 has an axial bore extending inwardly from the end as indicated at 17.

In making shaft 14 a piece of shaft stock has the bore 17 drilled therein and is machined out to provide the reduced extension 15 between the cam and the end of shaft 14. The cam 16 is then formed on the end of the shaft by die stamping through the use of suitably shaped dies to form the elliptical shape of the cam wherein the tubular metal structure at the end of the shaft is deformed from the cylindrical form of the stock into the elliptical form as illustrated in Figs. 1, 2 and 4 in order to provide the contact operating cam 16. Bore 17 provides space into which the metal in the end of the shaft is displaced in forming said cam. This die forming of the cams can be done by a cold die stamping operation and will accurately produce the elliptical cam for the efficient operation of contacts 8 in the desired timed relation to secure efficient motor operation. It will be noted that in the forming of the polygonal or elliptical cam, the bore 17 in the end of the shaft is also deformed in its shape by the metal being forced into the space provided by said bore to reduce its size and shape and that it is substantially elliptical in conformance with the elliptical shape of the outer surface forming cam 16.

The opposite end of rotor shaft 14 is formed with a reduced cylindrical extension 18 terminating in another reduced threaded extension 19. A shoulder is formed at 20 by the reduced extension 18.

An eccentric 21 is formed with a bore 22 to slidably engage and accurately fit on extension 18 so that one end of eccentric 21 will engage against shoulder 20 in the assembled relation of the eccentric on rotor shaft 14. Bore 22 in eccentric 21 has one end thereof reduced and threaded in order to threadedly engage on the threaded extension 19 in the manner illustrated in Fig. 2 so that eccentric 21 can be threaded onto extensions 18 and 19 to firmly and rigidly engage against shoulder 20 where eccentric 21 is firmly held in position against rotation relative to rotor shaft 14 in the operation of the motor.

A starting wheel 25 has a metallic supporting plate 26 formed with a central opening 27 to engage over the threaded reduced extension 19 on shaft 14. This plate 26 is embedded in suitable molded material indicated at 28 forming the outer covering and completing the wheel structure so as to provide a circular recess 29 on one side concentric to the opening 27 in plate 26. The side of starting wheel 25 formed with recess 29 has the margin thereof formed with a plurality of grooves and ribs indicated at 30 which is the portion that normally is exposed at the outside of a shaver through a suitable opening in the shaver case so as to provide for manual engagement with starting wheel 25 for starting the motor. The inner face of the covering 28 on starting wheel 25 is formed with an elliptical recess adjacent plate 26 as indicated at 31 in Fig. 4. Recess 31 is formed to receive one end of eccentric 21 in either of two positions when the starting wheel is assembled with eccentric 21 on the reduced extensions 18 and 19 of rotor shaft 14.

A roller 32 of insulating material of suitable character has a central aperture to receive the outer periphery of eccentric 21 for mounting and free rotation on eccentric 21 in the position shown in Fig. 2. Spacing and thrust bearing washer 33 is assembled on shaft 14 adjacent to eccentric 21, is of larger size than eccentric 21 and retains roller 32 on eccentric 21 when the motor shaft is assembled in the motor by reason of its engagement between eccentric 21 and the end of the right hand bearing 13 carried by insulating plate 4 as shown in Fig. 2. This thrust bearing washer 33 also acts to absorb the wear in the end-wise or axial motion of shaft 14 in bearings 13.

A spacing washer 34 is engaged on eccentric 21 between roller 32 and starting wheel 25 so as to compensate for wear in the rotation of roller 32 on eccentric 21. Retaining nut 35 is screw threaded on the reduced threaded extension 19 in the manner shown in Fig. 2. Nut 35 engages in opening 29 in starting wheel 25 against plate 26 so as to secure it firmly against one end of eccentric 21 which in turn is firmly seated against shoulder 20. When nut 35 is turned tightly to retain starting wheel 25 against the end of cam 21, the cam and the starting wheel are firmly secured on extensions 18 and 19 of the rotor shaft 14 against relative movement. Washers 33 and 34 and roller 32 are loosely positioned on the shaft in their assembled relation when the shaft is ready for assembly into bearings 13 before completing the motor structure.

The central portion of rotor shaft 14 is formed with a flat elongated section 36 forming a rotor locating means on the shaft. The rotor 37 is formed of laminated magnetizable material preferably having the laminations rigidly secured together by suitable rivets indicated in sections at 38 in Fig. 3. A two pole rotor is shown to correspond with the two pole stator. This rotor is formed in the central portion with a rotor shaft receiving bore 39 while the outer periphery of rotor 37 is concentric to the axis of bore 39. This rotor structure is of substantially conventional form.

A screw 40 threaded in the central portion of one side of the rotor between the ends thereof forms a rotor positioning and locating means. This set screw 40 has a flat end 41 constructed for engagement with flat portion 36 forming the locating means on shaft 14 so that when screw 40 is threaded inwardly so that flat end 41 will have firm engagement with positioning face 36 on shaft 14, rotor 37 is arranged in a fixed radial relation with respect to shaft 14 and cam 16. Cam 16 usually has the major axis thereof arranged at an angle of approximately 7° to the center line through the poles of rotor 37 in order to secure the proper relation between the cam and the rotor for the efficient operation of the motor. This angular relation is indicated by the dot and dash lines in Fig. 1 at 42.

In making rotor shaft 14 the locating face 36 is provided thereon in advance of forming the cam 16 as hereinabove described. This locating face 36 is used to control the radial position of shaft 14 during the formation of the cam so that cam 16 has the major axis of the ellipse forming the outer surface at the angular relation indicated by the numeral 42 in Fig. 1.

Then, in assembly of the rotor structure on the motor shaft 14, the end of the rotor shaft formed with cam 16 is inserted through bearing 13 in plate 4 after the eccentric and starting wheel together with washers 33 and 34 and roller 32 have been assembled thereon. Rotor 37 is positioned between plates 3 and 4 with bore 39 aligned with bearing 13 in plate 4 so that the end of shaft 14 may be inserted through shaft receiving bore 39 and through bearing 13 in the insulating plate 3. At the time of this assembly a thrust bearing washer 43, shown in Fig. 2, is engaged between bearing 13 in insulating plate 4 and rotor 37.

When rotor shaft 14 is completely engaged in the two bearings 13 in the position shown in Fig. 2, rotor 37 is then adjusted into position so that positioning of set screw 40 can be operated to engage end 41 with locating face 36. When this position is obtained, the shaft is adjusted to take up end play at the end carrying eccentric 32 and starting wheel 25. Rotor 37 is moved toward eccentric 21 on shaft 14 so that practically all of the space at the ends of bearing 13 in plate 4 is taken up and thrust bearing washers 33 and 43 engage the ends of bearings 13 in plate 4. At this point the tightening of set screw 40 on face 36 will assemble the rotor and rotor shaft in the proper operative position to obtain efficient operation of the motor.

The freeness of rotation must be tried after the set screw is tightened so that in adjusting the rotor on shaft 14 a binding action is not created between thrust washers 33 and 43 and the ends of bearing 13 in plate 4. If there is binding then screw 40 should be loosened and a slight adjustment made to allow a slight clearance between thrust washers 33 and 43 and bearing 13 so that just sufficient clearance is provided to allow free rotation of shaft 14 and rotor 37, but to prevent unnecessary end play during the operation of the motor. When the rotor and rotor shaft are assembled in this manner contact operating cam 16 will be positioned between cam engaging plates 11 carried by the contact arms 7 so that the make and break between contacts 8 will be properly timed with respect to the rotor in the rotation thereof in operating the motor.

It will be seen from this construction and assembly that uniformity in the manufacture of parts is obtained in which each of the parts of the rotor shaft structure and assembly with the rotor are interchangeable so that worn parts can be replaced. The attachment of the rotor 37 to shaft 14 in assembled relation is also used to obtain proper adjustment of the entire structure assembled on rotor shaft 14 in efficient operative position with rotor 37 secured at the proper angle relative to cam 16 without the use of gauges. Special adjustments are not required because screw 40 forms a cooperative locating means in engagement with locating face 36 on shaft 14 to automatically locate rotor 37 in the proper position with respect to cam 16. This enables the assembly of the entire rotor shaft structure and rotor in the motor in an efficient manner, rapidly and without the use of specially skilled labor, or special instruments or tools to make the assembly and proper adjustment of the rotor for free rotation in the bearings.

Cam roller 32 is adapted to engage a suitable operating lever, not shown, that is customarily used when a motor of this type is used in a dry shaver so that in the operation of roller 32 with eccentric 21 the rotary movement of the rotor shaft 14 may be transformed into reciprocating motion by the lever which roller 32 is constructed to engage in order to secure the operation of the shaver in a manner well-known in the art. Roller 32 and eccentric 21 may be used in any desired manner to transmit the power of the motor for producing the desired motion of the mechanism with which the motor may be associated in providing the source of driving power.

By forming rotor shaft 14 with the reduced extensions at both ends and positioning face 36 it will be seen that the shaft can be readily made in automatic machines and the positioning face 36 used to accurately locate and hold shaft 14 in position during the cold forming operation of cam 16. The dimension of the cam at the major axis thereof is not greater than the diameter of shaft 14. This provides not only for the economic manufacture of the shaft but also for the convenient assembly of the parts on the opposite end thereof as above described so that the end formed with cam 16 can be readily inserted through bearings 13 and shaft receiving bore 39 in rotor 37 in the assembly operation of the rotor on the shaft. A substantial saving in the cost of manufacture of motors is obtained through a construction and assembly of the parts as herein described.

It is to be further noted that by having one end of eccentric 21 engaged in recess 31 formed to snugly receive the eccentric in the starting wheel, relative movement of the eccentric and starting wheel in assembled relation will not occur. This removes direct strain on the extension 19 of shaft 14 in starting the motor particularly because the direct engagement of the starting wheel with the eccentric will directly drive the mechanism operated by the eccentric.

The contact operating cam is described as polygonal or elliptical but it is to be understood that this cam does not have to be in the form of a true ellipse but may be of any desired shape of the character well-known in the art for the purpose in view of which the term elliptical will comprehend these variations in structure.

Further, in making this cam the bore and reduced section of the shaft may be formed simultaneously or either in advance of the other in manufacture and the claims will be understood to include this interpretation.

The invention claimed is:

1. The method of making a rotor shaft for small electric motors which comprises forming an axial bore in a portion of one end of a solid cylindrical metal shaft of small diameter, removing a segment from the central portion of said shaft to form a flat positioning face, and deforming said end portion partially into the space formed by said bore while using said positioning face in holding said shaft in a predetermined position to form an external elliptical contact operating cam surface thereon having a major axis of a length not exceeding the shaft diameter in predetermined angular relation to said positioning face.

2. The method of making a rotor shaft for small electro-magnetic impulse motors which comprises forming a portion of one end of a solid cylindrical metal shaft of small diameter with an axial bore and a section of reduced diameter over the inner end of said bore, removing a segment of said shaft in the central portion to form a positioning face, and deforming said shaft at the end between said reduced section and the shaft extremity to provide an outer elliptical surface on said end while holding said shaft in fixed relation with said positioning face whereby said elliptical surface will have the major axis in predetermined radial relation to said face and said axial bore provides space into which the metal in said shaft end is deformed in providing said outer elliptical surface to form an integral contact operating cam.

3. The method of making a rotor shaft for small electric motors which comprises axially drilling a portion of the length of a small diameter cylindrical metal shaft at one end to form a longitudinal bore, turning said shaft to remove an outer peripheral portion over the inner end of said drilled portion to provide a section of reduced diameter, removing a segment from the central portion of said shaft to provide a flat positioning face thereon, deforming the end portion of said shaft between said reduced section and the extremity thereof while held in position by said positioning face to form a polygonal outer surface thereon in predetermined relation to said positioning face, and forming the opposite end of said shaft to provide a reduced cylindrical threaded extension and a shoulder at a predetermined distance from said positioning face, whereby a rotor may be adjusted longitudinally on the central portion of said shaft into a desired position relative to an eccentric mounted on said reduced extension in fixed relation to said shoulder while said positioning face positions said rotor radially on said shaft in predetermined angular relation to said polygonal outer surface forming a contact operating cam.

HARRY E. UPHAM.